US006824065B2

(12) United States Patent
Boone et al.

(10) Patent No.: US 6,824,065 B2
(45) Date of Patent: *Nov. 30, 2004

(54) IDENTIFICATION AND ACCOUNTABILITY SYSTEM AND METHOD

(75) Inventors: Christopher N. Boone, Middletown, CT (US); Jeffrey M. Whynall, Killingworth, CT (US); Rui M. Costa, Rocky Hill, CT (US); Richard Marciniec, Plainville, CT (US); Donald A. Roy, Middletown, CT (US)

(73) Assignee: Biosystems, LLC, Middletown, CT (US)

(*) Notice: Subject to any disclaimer, the term of this patent is extended or adjusted under 35 U.S.C. 154(b) by 348 days.

This patent is subject to a terminal disclaimer.

(21) Appl. No.: 09/934,862

(22) Filed: Aug. 22, 2001

(65) Prior Publication Data

US 2002/0024507 A1 Feb. 28, 2002

Related U.S. Application Data

(60) Provisional application No. 60/227,331, filed on Aug. 23, 2000.

(51) Int. Cl.[7] .................................. G06K 19/06

(52) U.S. Cl. .................. 235/492; 235/451; 235/462.46; 235/382; 235/382.5

(58) Field of Search ................................ 235/492, 451, 235/462.46, 382, 382.5

(56) References Cited

U.S. PATENT DOCUMENTS

| | | | | | |
|---|---|---|---|---|---|
| 5,433,612 | A | | 7/1995 | Daku | 434/226 |
| 5,596,652 | A | | 1/1997 | Piatek et al. | 382/115 |
| 5,633,742 | A | * | 5/1997 | Shipley | 398/118 |
| 5,689,234 | A | * | 11/1997 | Stumberg et al. | 340/521 |
| 5,793,882 | A | | 8/1998 | Piatek et al. | 382/115 |
| 5,990,793 | A | | 11/1999 | Bieback | 340/573 |
| 6,016,099 | A | * | 1/2000 | Campman | 340/321 |
| 6,029,889 | A | | 2/2000 | Whalen, Jr. et al. | 235/380 |
| 6,053,030 | A | * | 4/2000 | Whynall et al. | 73/23.2 |
| 6,543,444 | B1 | * | 4/2003 | Lewis | 128/200.24 |
| 6,570,583 | B1 | * | 5/2003 | Kung et al. | 345/661 |

* cited by examiner

*Primary Examiner*—Michael G. Lee
*Assistant Examiner*—Kimberly D. Nguyen
(74) *Attorney, Agent, or Firm*—Alix, Yale & Ristas, LLP

(57) ABSTRACT

An accountability and identification system includes multiple touch sensors and at least one instrument. At least one of the touch sensors is a personal identification touch sensor having user information on a unique user stored in the memory. One or more touch sensors may be a data touch sensor having user information on a unique group of users stored in the memory. Immediate danger to life and health (IDLH) devices have an IDLH touch sensor mounted thereon having information unique to the specific IDLH device stored in the memory. Each of the instruments includes a receptacle for reading the information stored on touch sensors, a microprocessor having a memory portion for storing operating software and the information read by the receptacle, a display, and an operator interface for controlling operation of the operating software.

16 Claims, 7 Drawing Sheets

IDENTIFICATION AND ACCOUNTABILITY SYSTEM AND METHOD

RELATED APPLICATION

This application claims the benefit under 35 U.S.C. § 119(e) of U.S. Provisional Patent Application Ser. No. 60/227,331 filed Aug. 23, 2000.

BACKGROUND OF THE INVENTION

This invention relates generally to identification and accountability systems, and in particular, to an identification and accountability system and method for firefighter personnel.

Information transfer and accountability systems may be used in any number of fields tasks where tracking personnel activity and location is important. Particular application is found in fields where individual personnel or teams of personnel operate in dangerous environments, or immediate danger to life and health (IDLH)environments. In such fields, it is advantageous to provide a system of tracking individual personnel locations, activities, etc.

Traditional firefighting accountability systems revolve around an individual Accountability Officer who monitors the positions of firefighters on-scene. The Accountability Officer may write down the name of or take an ID tag from a firefighter as he or she moves into the target area.

The drawbacks of traditional systems are apparent where multiple teams are quartered around a large target area. Manually tracking a large number of firefighters can be slow and is susceptible to error. Similarly, keyboard entry systems are too slow to be practically and reliably effective. Rapid response is often critical to containing the incident, and even temporary breakdowns in accountability can seriously hamper response efforts. The problem is compounded when team firefighters are separated from their group and end up regrouping with other teams at a point of access remote from the Accountability Officer.

U.S. Pat. No. 5,433,612 to Daku describes an electronic accountability apparatus for timing and tracking multiple teams of personnel and equipment, including multiple timers visible on an interface apparatus, the timers pre-assigned by label to team members and controllable by pushbutton switches. The apparatus interface is provided as a large case designed to be set at a particular accountability station. The apparatus does enhance the Accountability Officer's ability to track firefighters, but does not allow for entry of particular firefighter data, such as name, rank, unit number, etc. The apparatus also relies on accurate switch/keyboard manipulation by the Accountability Officer and does not provide for failsafe data entry.

One problem with the prior art systems is that it is extremely easy for a user to input incorrect information. A user is required to navigate several menus, scan particular codes or remember specific key stroke sequences to enter and/or activate the accountability apparatus. As a result a user may incorrectly select the wrong user or fail to activate a user in the system as users are moving to the scene. In addition, the amount of information that may be transferred by prior art systems is extremely limited.

An additional problem with the prior art concerns the systems that use a PC for downloading information to the instrument. In using such instruments it becomes burdensome to transport and safely store the PC while a user performs the underlying tasks suggested herein above. In addition the use of PC requires an increased skill level of an operator and increases the cost of the detection instrument system.

U.S. Pat. No. 6,029,889 to Whalen Jr. et al. describes an accountability system including a bar code reader, a computer, a display and an alarm. The system is reliant on an ID badge printed with multiple bar codes containing different types of information. In such systems, a bar code reader is connected to a detection instrument, which is used to scan bar code labels pertaining to users and locations. Although bar code instruments eliminate some the problems present in other prior art detection systems, they too have many problems. One problem, similar to the PC systems, is that a bar code reader must be attached to and therefore transported along with, the instrument. Another problem is that the bar code labels typically do not withstand some of the harsh environments where these instruments are typically used. While such a system is helpful to scene accountability, there is a danger that the ID badges will be damaged by fire or smoke. Additionally, selection of and scanning of particular bar codes can be cumbersome under rapid response conditions with multiple firefighters. Reprogramming of bar coded labels cannot be performed in real-time and is also difficult. Indeed, reprogramming of bar code labels requires reprinting and relaminating, neither of which can be practically performed under rapid response conditions with multiple firefighters.

What is needed in the art is a reliable accountability and identification instrument and system that increases accuracy, system flexibility, ease of use, that decreases log in/out times and that functions well in harsh environments.

SUMMARY OF THE INVENTION

The above-described drawbacks and disadvantages of the prior art are alleviated by the accountability and identification system of the present invention. The accountability and identification system comprises multiple touch sensors, each of which has information stored in a memory. At least one of the touch sensors is a personal identification touch sensor having user information on a unique user stored in the memory. The system also comprises at least one instrument. Each of the instruments includes a receptacle which momentarily receives the personal identification touch sensor to read the user information stored therein. Each instrument also includes a microprocessor in electrical communication with the receptacle. The microprocessor has a memory portion for storing operating software and the user information read by the receptacle. Each instrument further includes a display in electrical communication with the microprocessor. The display provides a visual indication of portions of the user information selected by the operating software.

Preferably, the memory portion of the microprocessor comprises flash memory and read only memory and the memory of the touch sensor comprises a programmable silicon chip. The user information may include a user identifier, next of kin, role, and medical information unique to the user. The microprocessor also has a data port which is electrically connected to first and second electrical contacts of the receptacle. First and second electrical contacts on each touch sensor are contacted to the first and second electrical contacts of the receptacle, respectively, to read the information stored in the memory of the touch sensor.

In addition, at least one of the touch sensors is a data touch sensor having user information on a unique group of users stored in the memory. The data touch sensor may also have incident data stored in the memory. Preferably, immediate danger to life and health (IDLH) devices will have an IDLH touch sensor mounted thereon. The IDLH touch sensor has IDLH information unique to the specific IDLH device stored in the memory. The IDLH information may include the name of the IDLH device, the rated lifetime of the IDLH device, the remaining lifetime of the IDLH device, and the time the IDLH device was logged-out for use.

Each instrument includes an operator interface in electrical communication with the microprocessor for controlling operation of the operating software stored in the memory. The operating software includes station, accountability, and sector modes of operation and the operator interface includes a mode button for selecting the mode of operation. The operator interface also includes first and second function buttons and the operating software includes WHO, YES, NO, ADD, OUT, acknowledge (ACK), TIME, and Personnel Accountability Report (PAR) initiation functions, the mode of operation assigning one of the software functions to each of the function buttons. The operator interface further includes a pair of scroll buttons.

The system provides accountability for individual firefighters, firefighting units, and firefighting equipment at a fire scene. User information pertaining to a single firefighter is recorded into the memory of a personal identification touch sensor which will be carried by the firefighter. This is repeated for each firefighter. The firefighters assigned to a firefighting unit log-in to a unit instrument at the start of each work shift by touching their personal identification touch sensor to the receptacle of the unit instrument, whereby the user information is read by the receptacle and stored into the unit instrument memory, forming a unit roster of on-duty firefighters. The unit instrument is carried to the scene of each fire visited by the firefighting unit. While at the fire scene, the officer in charge indicates in the unit instrument memory which firefighters of the unit roster are positioned in a dangerous environment at each point in time. At the end of the work shift, each firefighter logs-out from the unit roster by touching their personal identification touch sensor to the receptacle of the unit instrument. Preferably, data recorded in the memory of the unit instrument is periodically downloaded into a central computer. This may occur immediately after the firefighting unit has left the fire scene, at the end of each work shift, or at some greater interval, depending on the storage capacity of the unit instrument and the frequency and duration of the firefighting incidents.

The unit roster is maintained current by the officer in charge by logging-out firefighters from the unit roster as they individually leave the fire scene and logging-in individual firefighters to the unit roster who are newly arrived at the scene by touching their personal identification touch sensor to the receptacle of the unit instrument. When the firefighter's personal identification touch sensor is not available for use, such firefighter may be manually logged-out or logged-in with the unit instrument user interface. When a firefighter is manually logged-in, the software assigns a unique guest to each such firefighter.

Periodically, a personnel accountability report (PAR) is performed while the firefighting unit is at the scene of each fire to verify the location of each firefighter of the unit roster. During the PAR, the officer in charge indicates in the unit instrument memory the identity of each firefighter of the unit roster who cannot be located at the time of the PAR.

The officer in charge also indicates in the unit instrument memory which firefighters of the unit roster have IDLH equipment assigned to them. This is accomplished by scrolling through the unit roster with one of the scroll buttons until the identifier of the firefighter appears in the unit instrument display. Touching the IDLH touch sensor mounted on the IDLH equipment to the receptacle of the unit instrument causes the IDLH information stored thereon to be read by the receptacle, correlated with the record of the firefighter whose identifier is shown in the display, and stored into the unit instrument memory. Preferably, the IDLH information includes the remaining useful lifetime of the IDLH device and the unit instrument software initiates a timer routine which counts-down the remaining useful lifetime and provides at least one indication as the count-down approaches the end of such useful lifetime.

When multiple firefighting units are present at the fire scene, one of the firefighting units is designated as the command unit and the unit instrument of the command unit is designated as a central accountability instrument. Each of the other firefighting units is designated as a sector unit and the unit instruments of each of the sector units are designated as sector instruments. Each sector unit is logged-in into the central accountability instrument.

To log-in the sector units, the unit roster of each sector instrument is copied into the memory of a data touch sensor by touching the data touch sensor to the receptacle of the sector instrument, whereby the unit roster is read by the data touch sensor and stored in the memory. Touching the data touch sensor to the receptacle of the central accountability instrument causes a unique sector unit identifier and the unit roster information of the sector unit to be read by the receptacle and stored into the memory of the central accountability instrument. The central accountability instrument maintains first level and second level tiers of data. The first level tier includes the unit roster of firefighters who are individually logged-in to the central accountability instrument and the sector unit identifiers of each sector unit logged-in to the central accountability instrument. The second level tier includes the unit rosters of each sector unit logged-in to the central accountability instrument.

Changes in the information stored in the sector instruments is communicated to the central accountability instrument. Preferably, such communication is performed periodically by the sector instrument software via a transmitter/receiver contained in each unit instrument.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
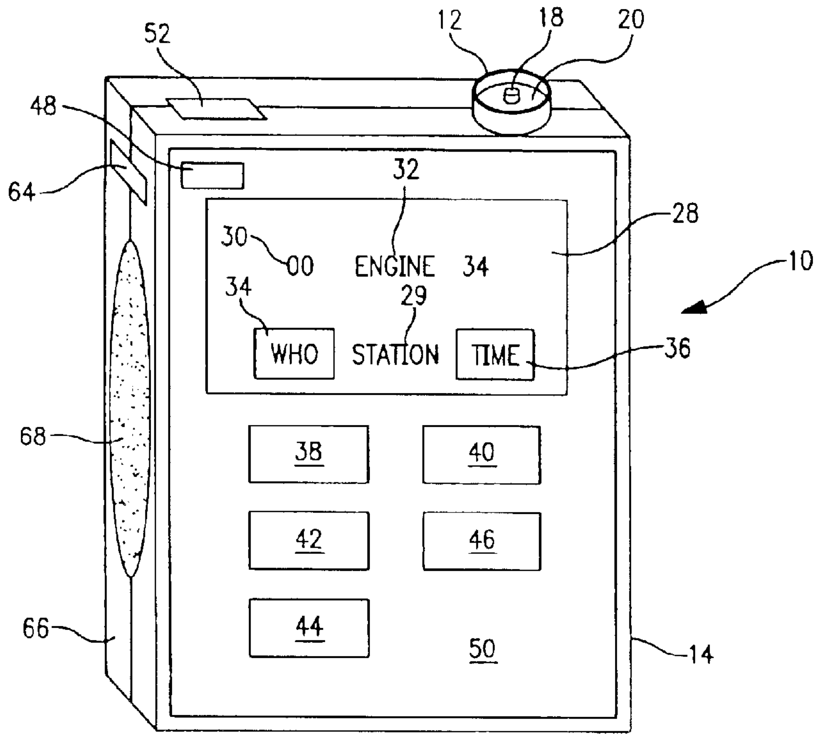
FIG. 1 is a front perspective view of an identification and accountability instrument in accordance with the present invention.
Figure 2:
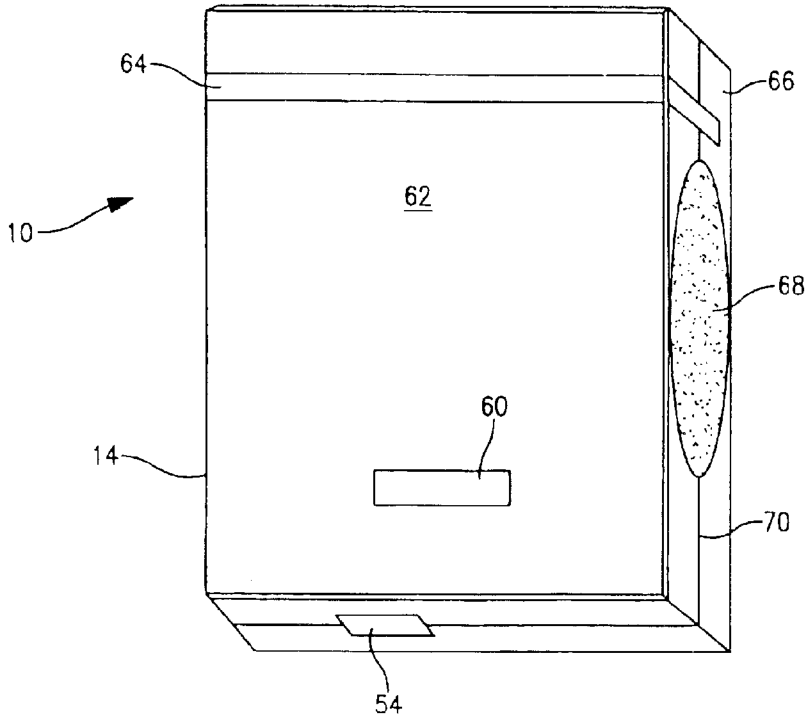
FIG. 2 is a back perspective view of the identification and accountability instrument of FIG. 1.
Figure 3:
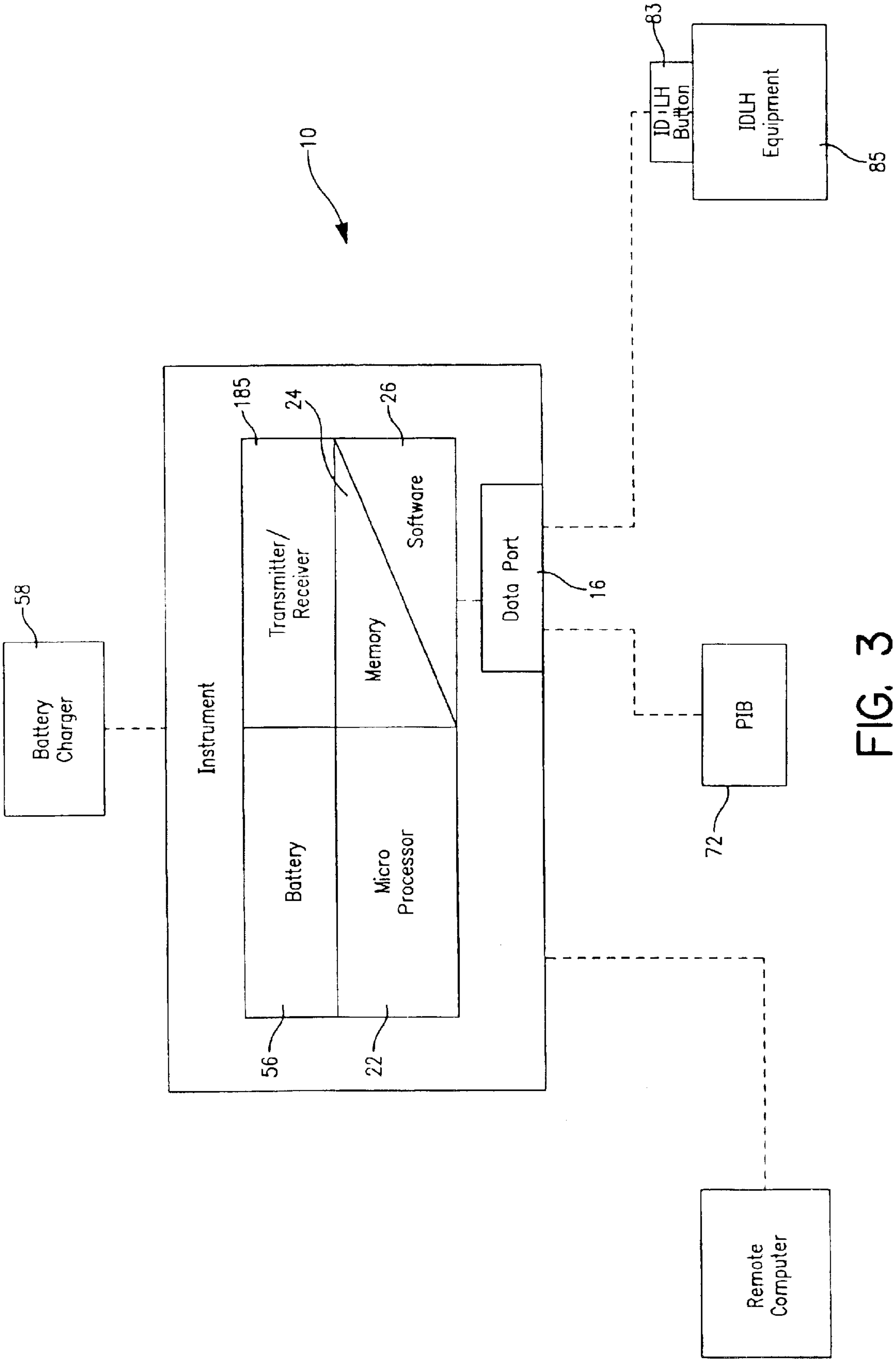
FIG. 3 is a schematic view of the identification and accountability instrument of FIG. 1, illustrating exemplary interfaces with other components of the identification and accountability system and with non-system apparatus.

An accountability and information instrument 10 in accordance with the present invention is shown generally as in FIGS. 1 through 3. In accordance with the present invention, the instrument 10 includes a receptacle connector 12 mounted to the housing 14 of the instrument 10. Receptacle connector 12, also referred to as a receptor, is electrically connected to a data port 16 of instrument 10 and is used to transfer information to the instrument 10. In an alternative embodiment (not shown) receptacle connector 12 is integrally molded into the housing 14 to eliminate external attachments to the instrument 10 and the environmental and interference problems described herein above. Receptacle connector 12 further comprises two contacts 18, 20.

Instrument 10 includes a microprocessor 22, preferably comprising a 16 bit micro controller with 512 kilobytes of flash memory and 32 kilobytes of boot ROM. Information may be stored in the memory 24 to configure a particular instrument. Such information may include the company name to which the instrument is being assigned, the current time and date, and whether the instrument should primarily display company or individual data.

Instrument 10 further includes appropriate software 26 to interpret and manipulate the information transferred and thereby provide a variety of functions including presenting messages and prompts for display on display screen 28. The screen 28 may simply provide a graphical interface, or it may include a data input feature, where the interface may be manipulated (for example, with a finger or stylus), and where such manipulation affects the resident software 26.

In the preferred embodiment of FIG. 1, the screen 28 is back-lighted and provides a variety of visual information. For example, the display screen 28 may provide a visual indication of the operating mode 29, the number of users 30 logged into the instrument 10, and the equipment 32 the instrument 10 is assigned to and performing accountability for. The display screen 28 also preferably provides first and second visual indicators 34, 36 of hot key assignments for first and second function buttons 38, 40, respectively, as described below.

A preferred series of interface buttons 38, 40, 42, 44, 46 are illustrated, including first and second function buttons 38, 40, first and second scroll buttons 42, 44 and a mode button 46. The operation of the first and second function buttons 38, 40 is dependent on the mode of operation and what step of the mode subroutine software is being performed. The first and second hot key visual indicators 34, 36 provide a display of the specific function of the first or second function buttons 38, 40 , respectively, at any time. Pressing either function button 38, 40 initiates the software action indicated in the associated visual indicator 34, 36. The scroll buttons 42, 44 generally scroll through a list of users or user information or allow a floating indicator (not shown) to be advanced or drawn back across the display 28. The mode button 46 transfers the instrument 10 from one mode of operation to another. The buttons 38, 40, 42, 44, 46 are preferably large to facilitate operation by a user wearing gloves.

The instrument preferably includes a power and/or system data transfer indicator 48 on the front wall 50 of the housing 14. The instrument 10 also preferably includes an infrared port 52, facilitating data transmission and/or providing visible indication of system data transfer.

Referring now to FIG. 2, the instrument 10 preferably includes a charging interface 54, the interface 54 allowing charging of an internal, rechargeable battery 56 via a battery charger 58. A recess, or groove 60, is shown on the back wall 62 of the housing 14. A mounting bracket 64 is shown attached to the back wall 62 and side walls 66 of the housing 14. The mounting bracket 64 facilitates secure attachment of the instrument 10 to, for example, a firefighter's turnout gear. The mounting bracket 64 may further include mounting rings (not shown), such that the mounting bracket 64 may be clipped to a neck strap.

Referring to FIGS. 1 and 2, the instrument 10 preferably includes a roughened area 68 on at least one side wall 66 of the housing 14 to facilitate handling of the instrument 10 by a gloved user in extreme conditions. Preferably, the roughened area 68 is a hard plastic or rubber. To protect the interior components of the instrument 10 in such conditions, the housing 14 is preferably sealed along all seams by a material 70, for example rubber, which is more compliant than the material of the housing 14.

Figure 5:
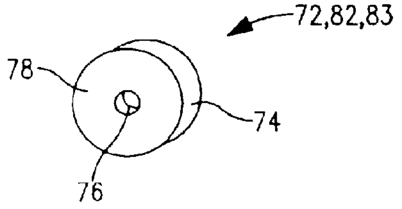
FIG. 5 is a perspective view of a personal information button.

Referring now to FIG. 5 there is shown an information button 72 comprising a computer chip (not shown) preferably encased within a stainless steel housing 74 and containing computer memory on which to store information. Information button 72 resembles a watch battery, as is known, and comprises two separate contacts 76, 78 to mate with contacts 18, 20. In an embodiment of the present invention receptacle connector 12 is a Blue Dot Receptor and information button 72 is an iButton™, both manufactured by Dallas Semiconductor.

Information button 72 comprises a silicon chip having a unique registration number engraved therein and a computer memory medium. The information button 72 is converted to a personal identification button (PIB) 72 by storing data pertaining to an individual in the computer memory medium. This data is initially entered into a personal computer (PC) which is configured as an instrument 10' and transferred to the PIB 72, as described below. Similarly, the information stored on the PIB 72 may be read by placing the PIB 72 within the connector 12. Momentary contact of contacts 76, 78 with contacts 18, 20 transfers information between the button 72 and the instrument 10, 10' at a rate of up to 142 kilobits per second. The same momentary contact also allows the instrument 10, 10' to re-program the button 72 in real time to reflect, for example, changes in status, changes in medical conditions entered by REHAB personnel or changes roster assignments.

Figure 6:
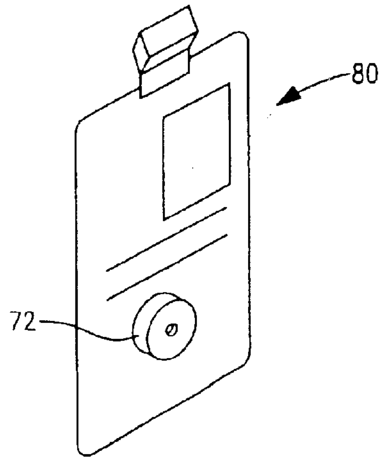
FIG. 6 is a perspective view of an identification badge having a personal information button in accordance with the present invention.

Referring now to FIG. 6, an example of a PIB 72 is shown as part of a typical identification badge 80 worn by an individual. Personal identification badges 80 are preferably made from a self extinguishing material suitable for use under extreme conditions and are assigned to all incident response personnel. The typical information stored in the memory of each PIB 72 includes any information which is pertinent to the individual. For example, such data may include user mode level (rank or role), identification of the user, including name, employee number, photographic image, age, sex, social security number, medical information (including information about allergies, conditions and blood type, among others), unit assignment, next of kin and user-specified default software settings, among others. The identification badge 80 may also include visual markings, which may include text or image identifiers.

Data transfer buttons 82 (physically identical to any other information button) are preferably programmed in a similar manner with authorization codes or executables to commence transfer of roster data from the handheld instrument 10 to another handheld instrument 10 or to a personal computer 10', or to activate transmission of data by other means, including cellular, RF or IR data transmission, among others. The data transfer button 82 may also be configured to store roster data in the computer memory medium of the button 82 for transfer to another handheld instrument 10 or to a personal computer 10'. Data transfer button 82 should be distributed to accountability officers along with the instrument 10. In an alternate embodiment, the accountability officers' PIBs 72 may also be programmed to act as data transfer buttons 82.

IDLH (Immediate Danger to Life and Health) buttons 83 may be mounted on self contained breathing apparatus (SCBA) or other IDLH equipment 85 having a limited lifetime of operation. IDLH buttons 83 are physically identical to PIBs 72 and data transfer buttons 82 and are programmed in a manner similar to that described above with information relating to the specific IDLH equipment 85 on which it is mounted. For example, such information may include the a unique identification number (such as a serial number) associated with the equipment 85, the name of the equipment (e.g. "SCBA"), the rated lifetime of the equipment, the remaining lifetime of the equipment, and the time the equipment was logged-out for use. As explained in greater detail below, IDLH equipment 85 may be logged-in to an instrument 10 and associated with a specific user so that the accountability officer and the associated sector officer (if scene has multiple sectors) may more actively monitor firemen utilizing IDLH equipment 85.

Figure 4:
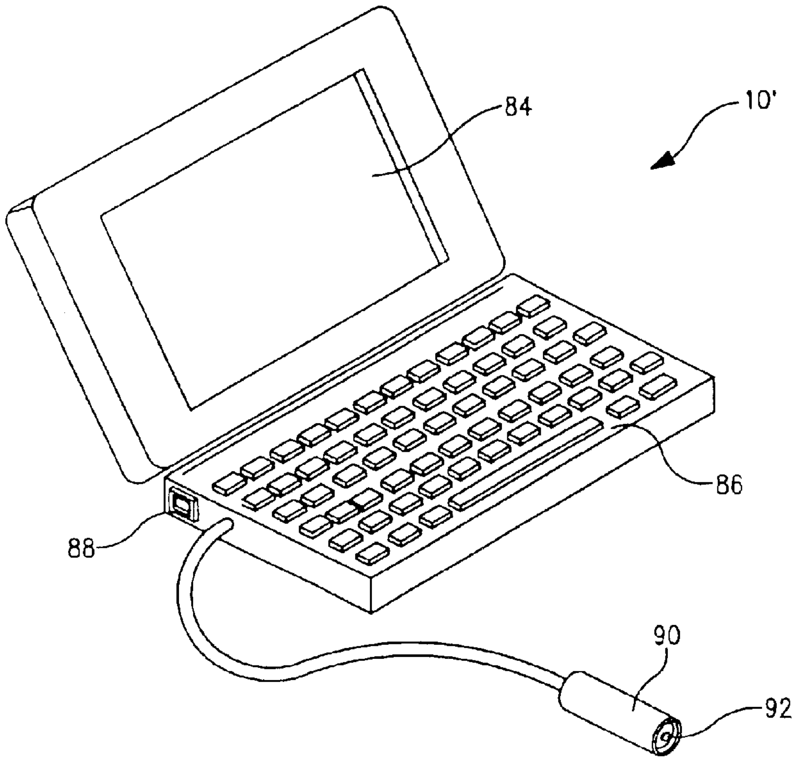
FIG. 4 is a perspective view of a personal computer having a wand in accordance with the present invention.

Turning now to FIG. 4, an alternative embodiment comprises a conventional personal computer 10' having volatile and non-volatile memory, a display 84, and a keyboard unit 86. In addition, the computer 10' has an infrared port 88 and a programming kit which comprises a wand 90 which connects to the serial port of the computer 10', a receptacle connector 92 on the wand 90, and programming software. The keyboard unit 86 or touch control software stored in the computer may be used to search for individual profiles or to scroll through individual profiles stored in memory. Personal data stored on a PIB 72 may be read or updated by contacting the PIB 72 to the receptacle connector 92 of the wand 90. A configuration mode in the software resident in the computer 10' allows information to be added, changed, updated or deleted in a quick and efficient manner.

Programming of information buttons 72, 82, 83 begins when an individual inserts a button 72, 82, 83 into the connector 92 on the wand 90. The connector 92 is similar to connector 12 as described herein above and interfaces with electrical contacts. Once the button 72, 82, 83 is inserted into the wand 90 the individual is led by prompts to program information into the button 72, 82, 83 using the keyboard 86 (or other data entry device). Once programming is complete the individual selects "upload" from the particular prompt and the information is transferred to the button 72, 82, 83.

The instrument 10 has three modes of operation: station mode, accountability mode, and sector mode. When the instrument 10 is not in use at the scene of a fire, it is in the station mode and is generally stored in the battery charger 58. The battery charger 58 may be mounted in and powered from a fire vehicle or mounted in and powered from the fire station.

Figure 7:
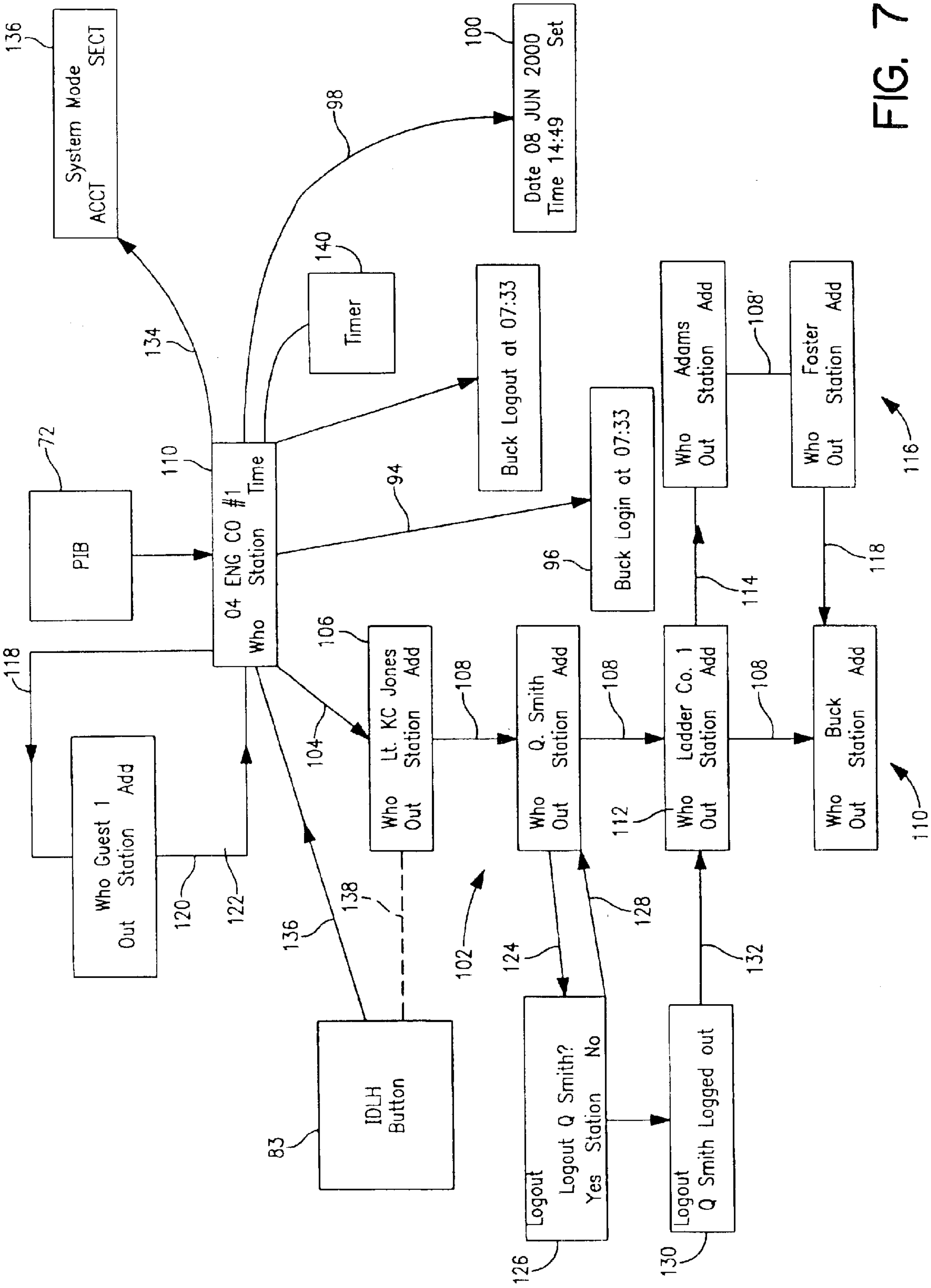
FIG. 7 is a schematic flow diagram of the instrument of FIG. 1 in station mode, illustrating the information provided on the instrument display.

Preferably, each fire fighter, or user, is issued an identification badge 80 including a PIB 72 that is unique and is preprogrammed to contain information specific to the individual to which it has been issued. As a user commences a duty shift, he or she logs-in by briefly contacting the PIB 72 on his/her identification badge 80 to the connector 12 on the instrument 10. When the instrument 10 is in the station mode, as illustrated in FIG. 7, logging-in 94 a user with his/her PIB 72 causes the software 26 residing in instrument 10 to record the user information stored in the PIB 72 in the instrument memory 24 and to briefly display 96 log-in information for the user on the display screen 28. Preferably log-in (and log-out) of users via the user's PIB 72 is further accompanied by flashing the power LED indicator 48 and by an audible indicator. In the preferred embodiment the audible indicator has an ascending tone on log-in and a descending tone on log-out.

Generally, the first function button 38 is the WHO hotkey and the second function button 40 is the TIME hotkey while the instrument 10 is in the station mode. When the TIME hotkey is pressed 98, the time stored in memory 24 is displayed 100 and may be adjusted with the scroll buttons 42, 44. The instrument 10 automatically reassigns the first and second function buttons 38, 40 as the WHO and TIME hotkeys after a preset period of time.

The roster 102 of logged-in users may be reviewed by pressing the WHO hotkey once 104, causing the software 26 to display information 106 on one of the logged-in users on the display screen 28. Information on each logged-in user may be viewed by pressing 108 the first or second scroll buttons 42, 44. To prevent the list of logged-in users from becoming too long for practical use, the software 26 utilizes a multi-tier log-in and display system. The names of all users directly logged-in to an instrument 10 will appear in the first tier 110 of the log-in and display system. In addition, if the rosters of later arriving engines or other firefighting units have been logged-in to the instrument 10 by a data button 82, a unique identifier 112 associated with each such later engine or unit will be displayed in the first tier 110. To review the roster information of a later engine or unit, one of the scroll buttons 42, 44 is pressed 108 until the identifier 112 of the later engine or unit is shown in the first tier 110 of the display 28. Touching 114 the WHO hotkey (button 38) will instruct the software 26 to display the roster information of the later engine or unit associated with the identifier shown in the display 28 in the second-tier 116 of the log-in and display system. Pressing 108' either scroll button 42, 44 will cause the names of the users in such roster to be successively displayed. The log-in and display system is returned to the first tier 110 by pressing 118 the mode button 46. It should be appreciated that the software 26 may include third, and higher, level tiers if required.

If a firefighter has misplaced his or her identification badge 80, they may be manually logged-in and/or manually logged-out of the instrument 10. The software 26 has ten (10) unique preprogrammed "guest" IDs. To manually log-in a user, the WHO hotkey (function button 38) is pressed 118, causing the software 26 to convert the function of the first function button 38 to the "OUT" hotkey and the function of the second function button 40 to the "ADD" hotkey. Pressing 120 the ADD hotkey (function button 40) causes the software 26 to assign the displayed guest ID (e.g. GUEST 1, GUEST 2) to the "guest" user. The software automatically returns 122 to the initial station mode after a preset period of time, reassigning the first function button 38 as the WHO hotkey and the second function button 40 as the TIME hotkey. It should be appreciated that a guest ID that has been logged-in must be logged-out before the software 26 will allow reuse of that guest ID.

To manually log-out a firefighter, one of the scroll buttons 42, 44 is pressed 108 until the name of the affected user, or guest ID if manually logged-in, is shown in the display 28. Touching 124 the WHO hotkey (button 38) will instruct the software 26 to reassign the first and second function buttons 38, 40 as the YES and NO hotkeys and to display a message 126 requiring verification of the manual logout of the selected individual. If the NO hotkey is pressed, the software 26 returns 128 to the roster presentation. If the YES hotkey is pressed, the selected user is logged-out, a message is displayed 130 in the display screen indicating such log-out, and the software 26 returns 132 to the roster presentation.

The first instrument 10 to arrive at the scene of the fire begins an accountability session. The accountability session is initiated by pressing the mode button three times 134, causing the software 26 to display a message 136 requiring the officer in charge to select either accountability mode or sector mode. If either the ACCT (accountability) hotkey or the SECT (sector) hotkey is pressed, the associated subroutine will be initiated, transforming the instrument 10 into an "accountability instrument" or a "sector instrument". If neither hotkey is pressed, the instrument 10 will be returned to the station mode after a preset time period. Removing the instrument 10 from its charging station will cause the software to display a prompt at the display 28 suggesting that the instrument 10 be transferred to either the accountability mode or the sector mode if the mode has not already been transferred. The accountability instrument 10 will take charge of the entire incident with regard to accountability. Specifically, in the accountability mode, the instrument 10 is configured to oversee incident command or accountability officer functions on-scene, including incident personnel log-in or log-out (preferably covering the entire on-scene roster), personnel log-in or log-out from IDLH environments and generation of personnel accountability reports (PARs).

Preferably, the sector and accountability instruments 10 track data corresponding to current rostering, default zone and role assignments, indication of whether breathing assist devices are employed and timing of breathing assist device usage. Preferably, as a user enters the work zone, a timer is activated on the instrument 10, for example by manual data entry or by holding down one or more keys while contacting the PIB 72 to the instrument receptacle, which records exposure time alongside roster data. As described above for exposure timer activation, the exposure timer may be stopped by manual data manipulation or by the PIB 72.

Preferably, when a piece of IDLH equipment 85 is assigned to a fireman, such equipment is logged-in to an instrument 10 and associated with the specific user to which it has been assigned so that the accountability officer and the associated sector officer (if scene has multiple sectors) may more actively monitor firemen utilizing IDLH equipment 85. This is accomplished by pressing 108 one of the scroll buttons 42, 44 until the name of the user is shown in the display 28. Touching 136 the IDLH button 83 to the receptacle connector 12 will cause the software 26 to log the information stored thereon into the instrument memory 24, identify the input device as an IDLH button 83, and associate 138 the information received from the IDLH button 83 with the user who's name is currently displayed. A timer sub-routine 140 of the software 26 may be initiated and identified with the IDLH button 83 to count-down the remaining useful life of the IDLH equipment, as determined from the information provided by the IDLH button 83. One or more warning signals may be emitted by the instrument 10 as the count-down approaches and arrives at the zero point in time (the end of useful life).

Figure 8:
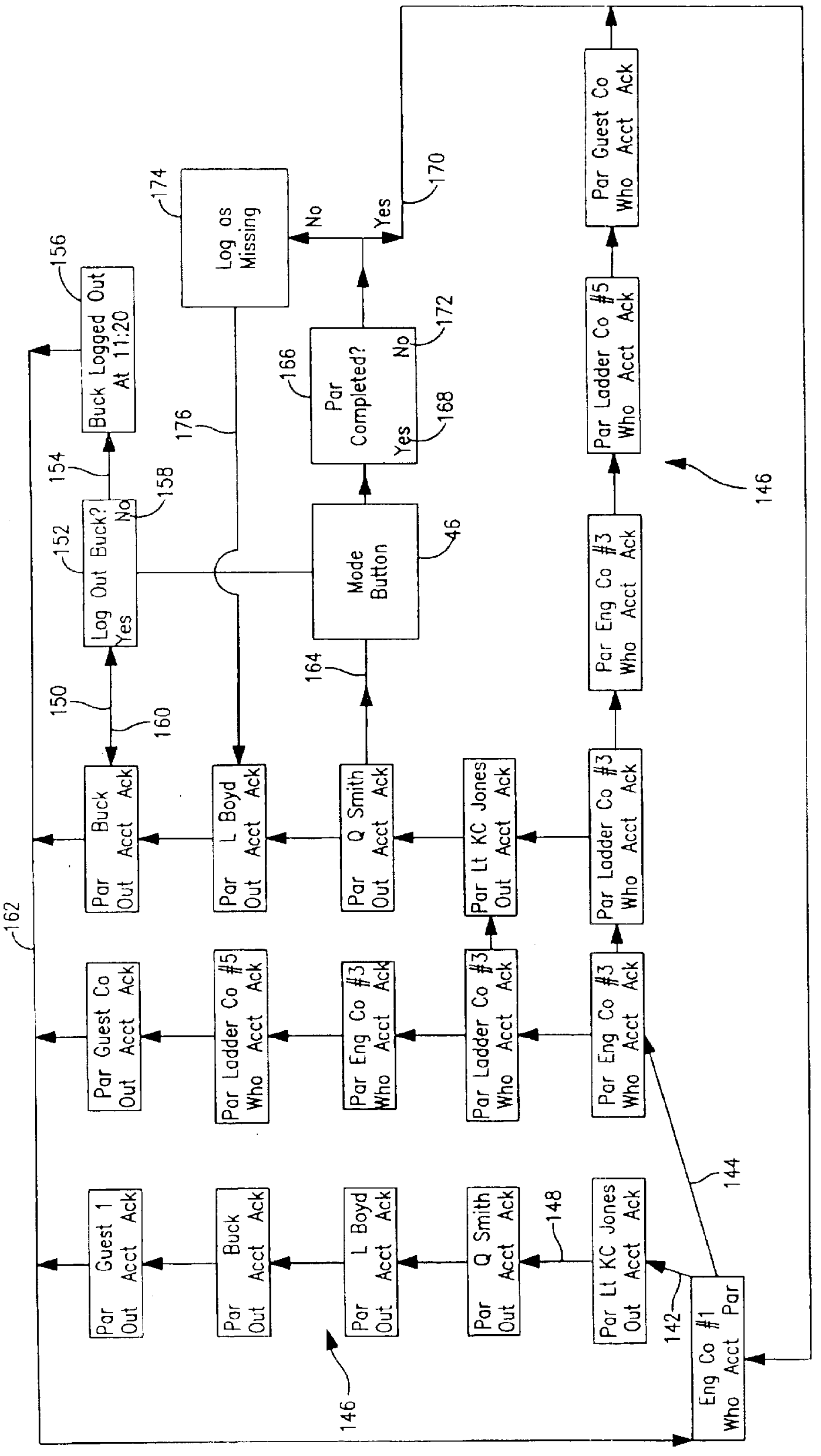
FIG. 8 is a schematic flow diagram of the instrument of FIG. 1 in the PAR routine, illustrating the information provided on the instrument display.

With reference to FIG. 8, Personnel Accountability Reports (PARs) are initiated 142 by the software 26 at predetermined intervals throughout the running of an accountability or sector session. A PAR may also be initiated 144 by pressing the mode button 46. During a PAR, the instrument displays a list of the logged-in personnel and units, and the accountability or sector officer must acknowledge either each individual or the company as a whole as being present and accounted for. Records are logged in memory for every PAR performed.

When the PAR subroutine is running on the instrument 10, the first function button 38 is assigned as the OUT hotkey and the second function button 40 is assigned as the ACK (ACKnowledge) hotkey. The software 26 sequentially presents 146 the name of each logged-in user and unit identifier 112 of the first tier 110 in the display 28. As each name and unit identifier 112 is presented, the accountability or sector officer must provide an input as to the status of that user or unit.

If the accountability or sector officer can personally verify, for example by sight, that the user or unit is still present at the scene, he/she presses the ACK hotkey 148 and the name of the next user/unit is presented in the display. If the accountability or sector officer knows that the user or unit has left the scene, he/she presses the OUT hotkey 150 and the software 26 reassigns the first and second function buttons 38, 40 as YES and NO hotkeys, respectively, and queries 152 whether that user/unit should be logged-out. To manually log-out the user/unit, the accountability or sector officer merely presses 154 the YES hotkey, the software logs-out the user/unit and displays a message 156 that the user/unit has been logged-out. If the NO hotkey is pressed 158, the software 26 returns 160 the display to the roster information on the user/unit (that is it backs-up one step). When the name of the last user/unit in the roster is acknowledged or manually logged-out, the software 26 terminates the PAR event and returns 162 the instrument 10 to either accountability or sector mode.

If the accountability or sector officer does not know that the user/unit has either left the scene or is present at the scene, he/she presses 164 the mode button 46 and the software 26 reassigns the first and second function buttons 38, 40 as YES and NO hotkeys, respectively, and queries 166 whether the PAR has been completed. If the YES hotkey is pressed 168, the software 26 records the user/unit as "missing" during the PAR event and returns 170 to either accountability or sector mode. If the NO hotkey is pressed 172, the software 26 records the user/unit as "missing" 174 during the PAR event and continues the PAR 176, displaying the name of the next user/unit. An asterisk appears next to the name of each user/unit who has been identified as being missing in the previous PAR when the roster is reviewed as described above. Should a user/unit who has previously been identified as missing be manually logged-out in a subsequent PAR, the user/unit's name will be removed from the roster. Should a user/unit who has previously been identified as missing be acknowledged in a subsequent PAR, the asterisk is removed from the roster display.

A record of all PARs is maintained in the instrument memory 24, including a record of all users/units who were identified as missing during each PAR. At the completion of the firefighting event, the PAR records are preferably downloaded to a central record keeping computer, as described more completely below.

Figure 9:
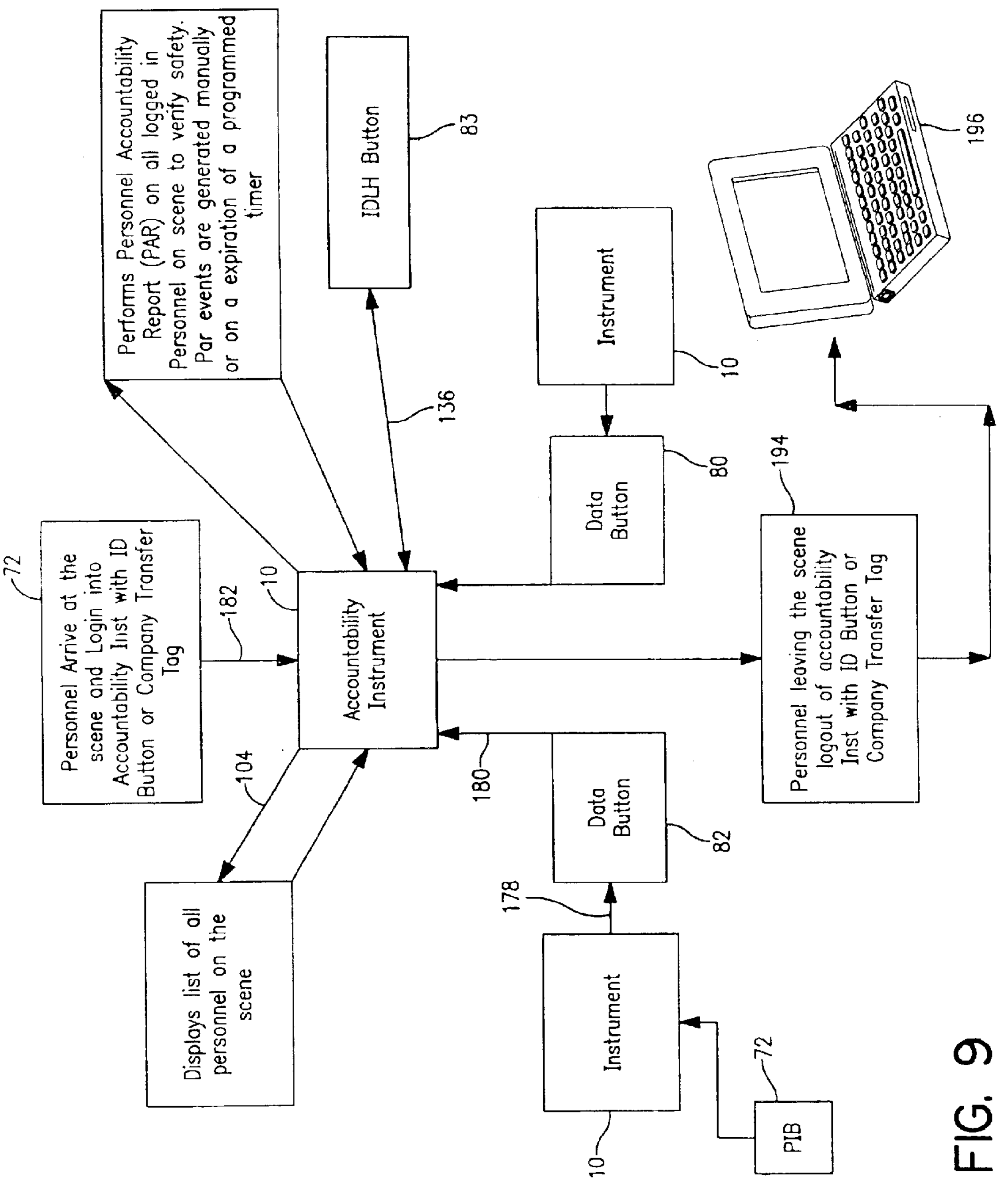
FIG. 9 is a schematic diagram of the instrument of FIG. 1 in accountability mode.
Figure 10:
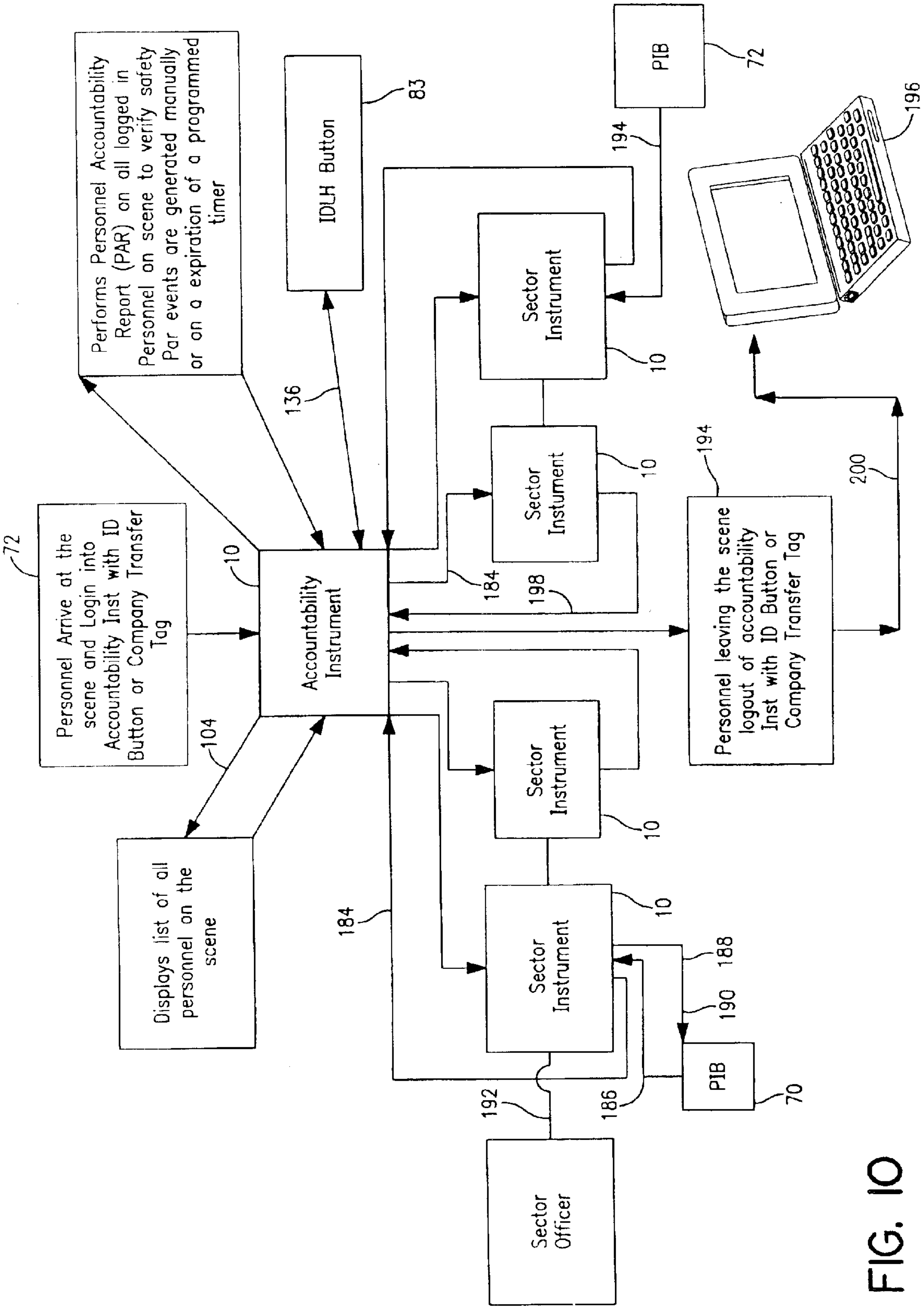
FIG. 10 is a schematic diagram of the instrument of FIG. 1 in sector mode.

If more than one firefighting unit is required at the fire scene, accountability may be maintained by one of two methods. If there are only a small number of additional units, accountability may be maintained on a single instrument 10, usually the instrument 10 of the first engine or firefighting unit to arrive at the scene (FIG. 9). The officer or other responsible party of each subsequently arriving engine momentarily contacts 178 a data transfer button 82 to the receptacle connector 12 of his instrument 10 to write the roster data, including PIB information stored with the roster names, in real time to the data transfer button 82. The information stored in the data transfer button 82 is then entered 180 into the accountability instrument 10 via its receptacle connector 12 and such instrument 10 maintains a single accountability roster for all firemen at the scene. Individually arriving firefighters may log-on 182 to the accountability instrument 10 using their PIB 72 or through manual data entry.

Where the number of firefighting units at the fire scene becomes too large to efficiently perform all accountability from one location, the instrument 10 of the first engine to arrive at the scene is designated as the accountability instrument 10, running in accountability mode, and maintains overall accountability for the entire scene (FIG. 10). The instruments 10 of later arriving engines are placed in the sector mode, thereby designating such instruments as "sector instruments", and maintain accountability for specific sectors of the scene. Sector mode operates similarly to accountability mode, preferably tracking personnel, exposure times to IDLH environments, etc., except that only those personnel operating within the particular sector are maintained on the sector roster.

Generally, the accountability data resident in the sector instruments 10 also is kept in the accountability instrument 10. Thus, on a scene that requires use of an accountability instrument 10 as well as one or more sector instruments 10, redundant records are maintained on the accountability and sector instruments 10. Each of the sector instruments 10 will have a unique identifier 112 which appears in the first tier 110 of the log-in and display system of the accountability instrument 10. The users logged-in to the sector instruments 10 will be logged-in to the accountability instrument 10 in a higher level tier, generally the second level tier 116. An instrument 10 is preferably switched into sector mode by pressing the mode button 46.

Information may be transferred between the accountability and sector instruments 10 by data transfer buttons 82. Preferably, the information transfer 184 between sector and accountability instruments 10 is performed periodically under the control of the software 26 via other common transmission protocols, such as IR, RF or cellular, among others via a transmitter/receiver 185 in each instrument 10. Data transfer 184 is preferably accompanied by visual indicators (e.g. flashing of the power indicator LEDs 48).

To avoid confusion at the scene, it is preferable to lock the sectors, that is, to allow each PIB 72 to log-in 186 to only one sector instrument 10 at a time (in addition to being logged into the main accountability instrument 10 via the sector instrument 10). Consequently, the software 26 is configured to write 188 a lockout record into each PIB 72 after it logs-in 186, such that the PIB 72 contains a record of whether it is logged into a sector instrument 10. When a user attempts to log-in to a sector instrument 10, the sector instrument 10 queries 190 the user's PIB 72 to detect the presence of a lockout record. If no lockout record is found, the sector instrument software logs-in 186 the PIB 72 and records 188 a lockout record in the PIB 72. If the software 26 determines that the PIB 72 already has a lockout record, the software 26 does not log-in the PIB 72.

However, it is also preferable that each officer operating a sector instrument 10 have the authority to override 192 a sector lock should that person learn that the owner of the locked PIB 72 has been manually logged out of the first sector instrument 10. This may be accomplished by providing the responsible person with a series of override keystrokes, or by programming override authorization codes on the responsible person's PIB 72 or on the data transfer button 82 corresponding to that instrument 10. Thus in the sector mode, the secondary, sector instruments 10 track constituent team rosters in specific portions or sectors of a fire scene by logging in or out only those personnel assigned to that particular sector. The sector mode otherwise performs all the functions of the accountability mode.

At the conclusion of an incident, all personnel log-out 194 from the sector and accountability instruments. The recorded information pertaining to the users, locations, exposure times etc. is downloaded 198 from the sector instruments 10 to the accountability instrument after a fire in which sectors were assigned. Periodically, the recorded information is downloaded into a central computer 196. The downloading operation may be carried out using data transfer buttons 82 or, preferably, other common transmission protocols, such as IR, RF or cellular, among others. Data transfer is preferably accompanied by visual indicators (e.g. flashing of the power indicator LEDs). The download may occur immediately after the firefighting unit has left the fire scene. However, immediate transfer of incident data from the accountability instrument 10 to the computer 196 is not required, since the accountability instrument 10 can store multiple incidents for future download to a computer 196. The maximum interval between downloads depends on the storage capacity of the unit instrument memory and the frequency and duration of the firefighting incidents.

The software application on the computer 196 advantageously displays the data in detailed time history format, tracking all events of the incident. The application assigns an incident number to each event before the incident is stored in a master database. Preferably, the application allows the user to enter additional detailed information of the incident for report generation.

Thus the information transferred to and subsequently stored on the computer 196 is accurate and timely because it is free of human entry errors as a result of using the instrument identification system comprising a PIB 72 and connectors 12 and the methods outlined herein in accordance with the present invention.

In another embodiment, the instrument 10 is provided with a manual data entry device, including, for example, a keyboard, magnetic touch pad, voice-to-text device or a device containing a preloaded comprehensive roster of all personnel communicable with the instrument via a connector 12, the IR port 88, a cellular or RF link 185, or other known data transmission protocol/apparatus. Thus, specific data for personnel reporting without a PIB may be entered into the accountability or sector instruments 10 manually.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An accountability and identification system, comprising:

a plurality of touch sensors, each touch sensor including a memory and
information stored in the memory,
at least one of the touch sensors being a personal identification touch sensor having user information on a unique user stored in the memory;
at least one of the touch sensors being a data touch sensor having user information on a unique group of users stored in the memory: and
at least one instrument, each instrument including
a receptacle adapted for momentarily receiving the personal identification touch sensor to read the user information stored therein,
a microprocessor in electrical communication with the receptacle, the microprocessor having a memory portion for storing operating software and the user information read by the receptacle, and
a display in electrical communication with the microprocessor, the display providing a visual indication of portions of the user information selected by the operating software.

2. The information and identification system of claim 1 wherein the memory portion of the microprocessor comprises flash memory and read only memory.

3. The information and identification system of claim 1 wherein the memory of the touch sensor comprises a programmable silicon chip.

4. The information and identification system of claim 1 wherein the user information includes a user identifier, next of kin, role, and medical information unique to the user.

5. The information and identification system of claim 1 wherein the microprocessor also has a data port, each touch sensor also includes first and second electrical contacts, and the receptacle has first and second electrical contacts in electrical communication with the data port, the first and second electrical contacts of the touch sensor being contacted to the first and second electrical contacts of the receptacle, respectively, to read the information stored in the memory of the touch sensor.

6. The information and identification system of claim 1 wherein at least one of the touch sensors is a data touch sensor having incident data stored in the memory.

7. The information and identification system of claim 1 wherein each instrument includes an operator interface in electrical communication with the microprocessor for controlling operation of the operating software.

8. The information and identification system of claim 7 wherein the operating software includes station, accountability, and sector modes of operation and the operator interface includes a mode button for selecting the mode of operation.

9. The information and identification system of claim 8 wherein the operator interface includes first and second function buttons and the operating software includes WHO, YES, NO, ADD, OUT, acknowledge (ACK), TIME, and Personnel Accountability Report (PAR) initiation functions, the mode of operation assigning one of the software functions to the first and second function buttons.

10. The information and identification system of claim 7 wherein the operator interface includes a pair of scroll buttons.

11. The information and identification system of claim 1 wherein each instrument includes an infrared port, the operating software controlling transmission of data through the infrared port.

12. The information and identification system of claim 1 wherein the operating software includes station, accountability, and sector modes of operation, wherein all instruments operating in sector mode communicate with a single instrument operating in accountability mode.

13. The information and identification system of claim 12 wherein each instrument further includes a radio or cellular component providing communications between the instruments operating in sector mode and the instrument operating in accountability mode.

14. The information and identification system of claim 1 further including an immediate danger to life and health (IDLH) device, one of the touch sensors being an IDLH touch sensor mounted to the IDLH device, the IDLH touch sensor having IDLH information unique to the specific IDLH device stored in the memory.

15. The information and identification system of claim 14 wherein the IDLH information is selected from the group consisting of a unique identifier, the name of the IDLH device, the rated lifetime of the IDLH device, the remaining lifetime of the IDLH device, and the time the IDLH device was logged-out for use.

16. The information and identification system of claim 1 further including a central record keeping computer adapted for receiving data from an instrument.

* * * * *